June 20, 1933.   J. S. STEWART   1,914,731
SPRING TOOTH FOR HARROWS
Filed April 9, 1932
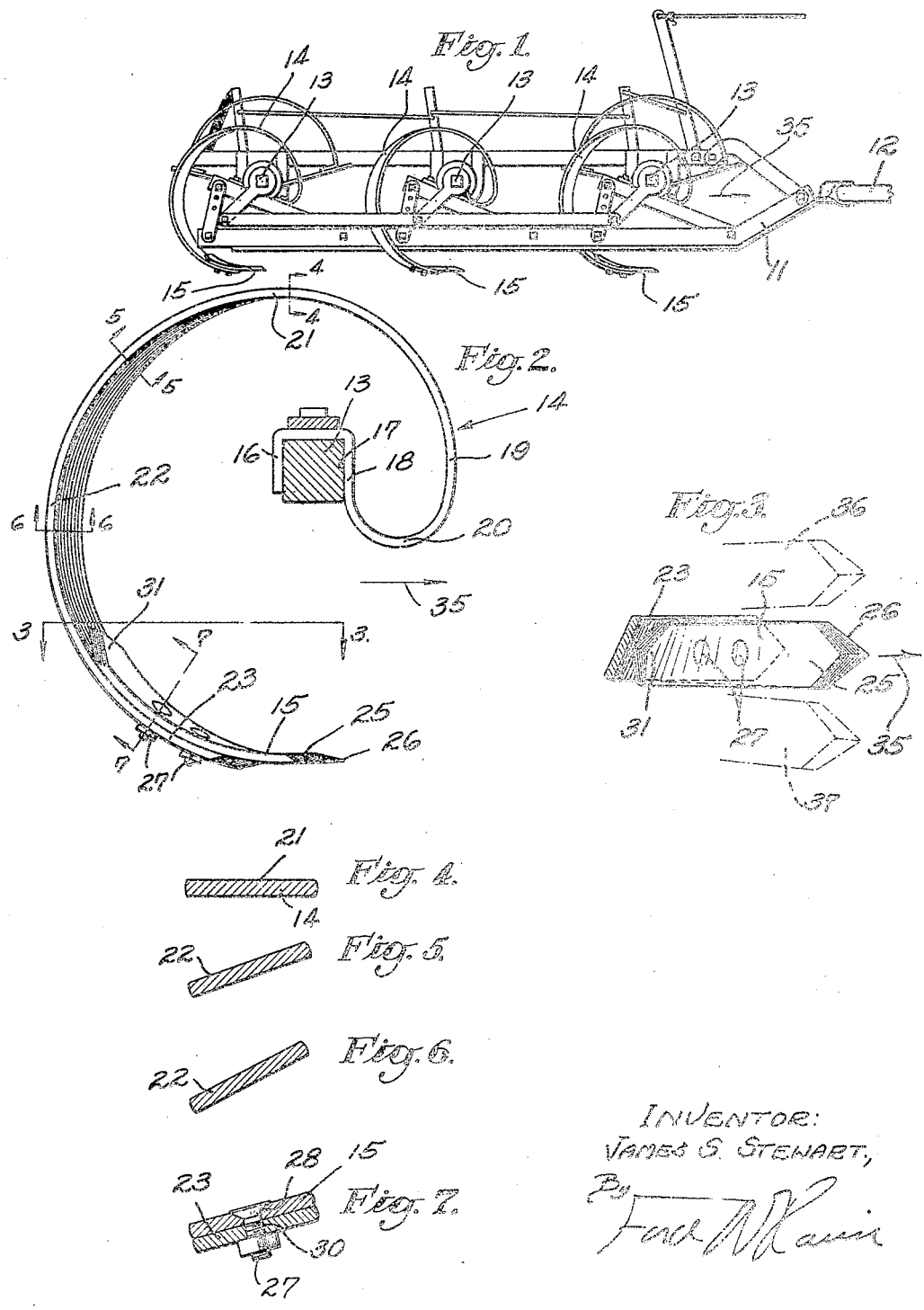

Patented June 20, 1933

1,914,731

UNITED STATES PATENT OFFICE

JAMES S. STEWART, OF SIDNEY, OHIO, ASSIGNOR TO BRENNEIS MANUFACTURING COMPANY, OF OXNARD, CALIFORNIA, A CORPORATION OF CALIFORNIA

SPRING TOOTH FOR HARROWS

Application filed April 9, 1932. Serial No. 604,224.

My invention relates to an earth-working tool of the character of harrows, and relates especially to a tooth member having a characteristic form and manner of operation.

It is an object of my invention to provide a cultivator having a tooth member which will reciprocate laterally in a horizontal plane as it is pulled forwardly, thereby thoroughly working the ground and cutting off the root formations or weeds which may extend down into the ground. In my invention I have produced a spring tooth member which operates in a manner contrary to spring teeth of the character commonly employed in spring tooth harrows. The ordinary spring type of harrow tooth will vibrate forwardly and rearwardly relative to the direction in which the harrow is moving in a jumping or intermittent manner, and such tooth will cut through a path no wider than its greatest width. My new harrow tooth when being pulled forwardly through the ground swings from side to side, a condition which is quite contrary to what is known of and expected from spring type harrow teeth.

Accordingly, it is an object of the invention to provide a spring tooth member for an agricultural implement so formed that the above-noted action of its cutting point will be obtained.

It is a further object of the invention to provide a replaceable tooth for a spring tooth member of the above type which will cooperate in the performance of the above-noted function.

Further objects and advantages of the invention will be brought out in the following part of the specification.

Referring to the drawing which is for illustrative purposes only,

Fig. 1 is a side elevation of an agricultural implement of my present invention.

Fig. 2 is an enlarged view of one of the tooth members forming the principal element of the invention.

Fig. 3 is a cross-section on a plane represented by the line 3—3 of Fig. 2.

Figs. 4, 5, 6, and 7 are cross-sections on the respective planes indicated by the lines 4—4, 5—5, 6—6, and 7—7 of Fig. 2.

My present invention embodies subject matter divided from my prior application, Serial No. 441,539, entitled spring tooth harrow, filed April 4, 1930, and from which United States Letters Patent No. 1,831,041 was granted.

Referring to the drawing, my invention provides as shown in Fig. 1 a frame 11 which is adapted to be pulled forwardly by means of a draft bar 12. This frame 11 supports a plurality of horizontal laterally directed shafts 13 on which tooth members 14 are secured in such position that the lower ends of points 15 thereof will lie in a plane below the frame 11 so as to engage the soil which is to be cultivated. The bars 13 may be supported in any desired manner and accordingly this application is not concerned with the form or disposal of the parts whereby the bars 13 are secured to the frame 11. The invention consists and resides in a harrow having a supporting frame including lateral bars from which spirally curved tooth members 14 extend downwardly in a manner to work the soil, the form and construction of these tooth members being clearly shown in Figs. 2 to 7 of the drawing.

In Fig. 2 I have shown one of the bars 13 and a single tooth member 14 secured thereto. This spring tooth member 14 is constructed from a strip 19 of flat steel having its upper extremity 16 bent so as to form an inverted channel 17 adapted to fit over the square bar 13 in the manner shown in Fig. 2. From the forward side 18 of the securing means provided by the channel 17 the metal strip 19 is bent forwardly and then upwardly so as to form an inverted U or gooseneck 20.

Following the gooseneck the strip 19 is continued upwardly and rearwardly through an arc so as to form a substantially horizontal upper portion 21, from which the strip 19 continues rearwardly and downwardly to form a rearwardly or downwardly extending portion 22 of arcuate form, the lower end 23 of which curves forwardly. A partly circular configuration of the parts 21, 22, and 23 of the tooth member 14 results. Secured to the lower end 23 of the downwardly extending portion 22 in forwardly directed position is a horizontally flattened detachable point or tooth proper 15 which is constructed from strip material preferably of the same cross-section as the strip material employed in the part 22 of the tooth member 14. The upper portion 21 is substantially cylindrical; but, as the metal strip 19 from which the tooth member is formed progresses downwardly through the intermediate or central part of the downwardly extending portion 22, it twists into a diagonal position relative to a plane passing perpendicularly through the bar 13 as will be perceived from Figs. 5 and 6 taken in conjunction with Fig. 2, the purpose of this twist being to bring the front face of the downwardly extending portion into a position diagonal with respect to a plane perpendicular to the forward line of movement of the harrow and to so dispose the steel in the downwardly extending portion 22 that it will have a lateral resiliency contributing to the characteristic movement of the tooth 15, which will be hereinafter set forth. As the lower end 23 is approached, the metal wall or strip 19 then twists back toward cylindrical position relative to an axis extending parallel to the bar 13. The strip 19 as it approaches the lower end 23 may also be said to twist from diagonal position back toward a position perpendicular to a plane which is perpendicular to the bar 13. The lower end 23 is not brought back to a position fully perpendicular to the above-noted plane but retains a slight diagonal twist therein.

The point or tooth proper 15 has a forward end 25 which is sharpened as shown at 26. This forward end 25 lies in a substantially horizontal plane or in a plane tangential to the bar 13. The portion of the point 15 extending rearwardly from the forward end 25 curves upwardly and twists lengthwise and diagonally with respect to a plane perpendicular to the bar 13 to correspond with the twist of the lower end 23 of the diagonal metal strip, formed by the downwardly extending portion 22, against which lower end 23 the tooth 15 is secured by means of bolts 27 which are extended through countersunk holes 28 in the tooth 15 and through openings 30 in the lower end 23. The openings 28 are placed intermediate the ends of the tooth 15 and the rearward end 31 of the tooth 15 is sharpened; therefore, the tooth 15 may be reversed from the position in which it is shown, the end 31 then being disposed in the cutting position now occupied by the forward end 25. The strip 19 is of such cross-section that it imparts to the tooth member 14 a fair amount of resilience, and the shape into which the strip 19 is bent to form the tooth member 14 provides an ample length of resilient material to absorb shocks due to the teeth striking abutments during their forward movement.

A noteworthy feature of the invention is that as the teeth members 14 are moved forwardly in the direction of arrows 35 of Figs. 1, 2, and 3, the point or tooth proper 15 will reciprocate from side to side in a horizontal plane as indicated by dotted lines 36 and 37 in Fig. 3, thereby accomplishing a very complete working of the soil, and a cutting off of subsoil growths.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A cultivator tool of the character described, comprising: a spring tooth having a downwardly extending portion and a forwardly directed, horizontally flattened tooth portion at the lower end thereof, said downwardly extending portion having a diagonal front face and being characterized by such lateral resiliency that said tooth portion will reciprocate laterally with respect to the forward movement thereof as said tooth is moved through the soil.

2. A cultivator tool of the character described, comprising: a spring tooth having a downwardly extending portion and a forwardly directed tooth portion at the lower end thereof, said downwardly extending portion being characterized by such resiliency in a direction lateral to the forward movement of the cultivator that said tooth portion will reciprocate laterally with respect to the forward movement thereof as said tooth is moved through the soil.

3. A cultivator tool of the character described, consisting of a flat bar, comprising: a spring tooth, said spring tooth extending downwardly from the front face of said bar and curving forwardly, upwardly and rearwardly over the top of said bar, then curving downwardly to the rear of said bar and forwardly under said bar to form a tooth portion lying in a substantially horizontal plane, said downwardly curving portion being twisted to a position diagonal to the direction of travel of said cultivator.

4. A cultivator tool of the character described, for use with a substantially horizontal tooth holding bar having a front face, comprising: a spring tooth, said spring tooth extending downwardly from the front face of said bar and curving forwardly, upwardly and rearwardly over the top of said bar, then curving downwardly to the rear of said bar and forwardly under said bar to form a tooth portion lying in a substantially horizontal plane, the downwardly curving portion of said spring tooth being twisted diagonally relative to the forward movement of the cultivator and being of such resilience that said tooth portion will reciprocate laterally with respect to said forward movement as said tooth moves through the soil.

5. A cultivator tool of the character described, for use with a horizontal tooth holding bar having a front face, comprising: a spring tooth, said spring tooth having an attachment portion for securing it to said bar, and a spirally curved portion extending downwardly from the front of said attachment portion, and curving forwardly, upwardly and rearwardly over the top of said bar, then curving downwardly to the rear of said bar and forwardly to form a tooth portion, the downwardly curving portion of said spring tooth being twisted diagonally relative to the forward movement of the cultivator.

6. A cultivator tool of the character described, for use with a tooth holding bar, comprising: a spring tooth having a downwardly extending portion and a forwardly directed substantially horizontal, flattened tooth portion at the lower end thereof, said downwardly extending portion having a diagonal front face and being characterized by resiliency, so that said tooth portion will reciprocate laterally with respect to the forward movement thereof as said tooth is moved through the soil.

7. A cultivator tool of the character described, comprising: a tooth member comprising a flat strip extending downwardly and having its lower end forwardly curved, said flat strip having a front face, the intermediate portion of which is diagonal to the direction of movement of the cultivator, and the lower end of which twists toward a horizontal plane; and a substantially horizontal point member secured to the lower end of said tooth member, the rearward end of said point member having a twist therein corresponding to the twist of said lower end of said tooth member.

8. A cultivator tool of the character described, comprising: a tooth member comprising a flat strip extending downwardly and having its lower end forwardly curved, said flat strip having its intermediate portion disposed at an angle to a plane perpendicular to the direction of movement of the cultivator and its lower end twisted toward a horizontal plane; and a substantially horizontal point member secured to the lower end of said tooth member, the rearward end of said point member having a twist therein corresponding to the twist of said lower end of said tooth member.

9. A cultivator tool of the character described, comprising: a tooth member comprising a flat strip extending downwardly and having its lower end forwardly curved, said flat strip having its intermediate portion disposed at an angle to a plane perpendicular to the direction of movement of the cultivator and its lower end twisted toward a horizontal plane; and a substantially horizontal point member detachably secured to said lower end of said tooth member in a position projecting forwardly therefrom, said point member having both of its ends sharpened and being of symmetrical form so as to be secured to said lower end of said tooth member with either end thereof directed forwardly.

10. A detachable tooth for the lower end of a cultivator tooth member having a downwardly extending diagonal strip, the lower end of which turns forwardly and twists toward a horizontal plane, said tooth comprising a substantially flat metal body having its forward end sharpened and having a lengthwise twist therein.

11. A detachable tooth for the lower end of a cultivator tooth member having a downwardly extending diagonal strip, the lower end of which turns forwardly and twists toward a horizontal plane, said tooth comprising a substantially flat metal body having ends sharpened and having a lengthwise twist therein, said body having holes intermediate its ends for use in securing it to said lower end of said tooth member.

12. A harrow tooth of the character described, including: a point portion consisting of a substantially horizontal body, a rising portion extending upwardly from said point portion and an upper portion equipped with means for securing it to a harrow frame, said rising portion being so formed as to flex laterally and produce a lateral reciprocating movement of said point portion.

13. A harrow tooth of the character described, including: a flat metal wall structure formed to provide a point portion consisting of a substantially horizontal body, a rising portion extending upwardly from said point portion and an upper portion equipped with means for securing it to a harrow frame, said rising portion being twisted into diagonal position so as to flex laterally in response to longitudinal force and produce a lateral reciprocating movement of said point portion.

14. A harrow tooth of the character described, including: a flat metal wall structure formed to provide a point portion extending forwardly in such position that the forward portion thereof will lie and move within a plane substantially parallel to the movement of the harrow, a rising portion extending upwardly from said point portion and an upper portion equipped with means for securing it to a harrow frame, said rising portion being twisted into diagonal position so as to flex laterally in response to longitudinal force and produce a lateral reciprocating movement of said point portion.

In testimony whereof, I have hereunto set my hand at Sidney, Ohio, this 1st day of April, 1932.

JAMES S. STEWART.